Figure 1:
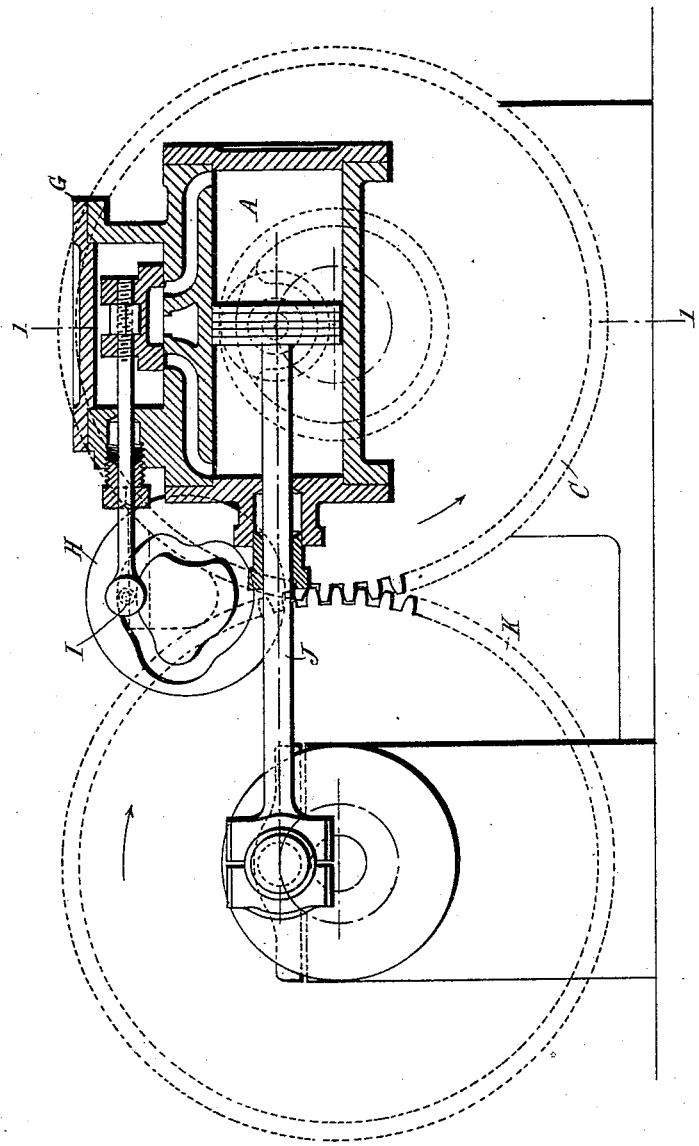

No. 632,010. Patented Aug. 29, 1899.
H. E. GAMBLE.
STEAM ENGINE.
(Application filed June 23, 1899.)

(No Model.) 3 Sheets—Sheet 1.

WITNESSES.
Arthur A. Fisher.

INVENTOR.
Henry Emmett Gamble
by Foster Freeman
Attorneys

No. 632,010. Patented Aug. 29, 1899.
H. E. GAMBLE.
STEAM ENGINE.
(Application filed June 23, 1899.)

(No Model.) 3 Sheets—Sheet 2.

WITNESSES.
Arthur A. Fisher
JGHinkel

INVENTOR.
Henry Emmett Gamble
by Foster Freeman
attorneys

THE NORRIS PETERS CO., PHOTO-LITHO., WASHINGTON, D. C.

No. 632,010. Patented Aug. 29, 1899.
H. E. GAMBLE.
STEAM ENGINE.
(Application filed June 23, 1899.)
(No Model.) 3 Sheets—Sheet 3.

WITNESSES.
Arthur A. Fisher
JG Hinkel

INVENTOR.
Henry Emmett Gamble
by Foster Freeman
attorneys

UNITED STATES PATENT OFFICE.

HENRY EMMETT GAMBLE, OF HOBOKEN, BELGIUM.

STEAM-ENGINE.

SPECIFICATION forming part of Letters Patent No. 632,010, dated August 29, 1899.

Application filed June 23, 1899. Serial No. 721,565. (No model.)

*To all whom it may concern:*

Be it known that I, HENRY EMMETT GAMBLE, a citizen of the United States of America, residing at Hoboken, Belgium, but temporarily of London, England, have invented certain new and useful Improvements in Steam and other Fluid-Pressure Engines, of which the following is a specification.

Among the objects sought to be attained by the use of this invention are the reduction of vibration over that usually found in reciprocating engines, simplicity of construction, and economy in working.

The nature of the invention may be broadly stated as consisting in causing the pressure in the cylinder to produce at the same time motion in both directions, the parts being so coupled or connected that the motion of either of the parts tends to produce an opposite movement of the other part.

The invention may be carried out by mounting the engine-cylinder on trunnions eccentrically placed with reference to the rotatable disks which carry it. The piston or connecting rod is similarly mounted on a second disk, which is in gear, however, with that or those carrying the cylinder. With this construction motion of the piston causes the disk carrying the piston-rod to rotate in one direction, and that motion alone would cause the disk carrying the cylinder to rotate in the other; but this end is also assured by the pressure between the cylinder end and piston, which tends to rotate the cylinder-carrying disk in one direction and through the gear the piston-carrying disk in the other. In this manner an equalization of forces is attained and an engine more perfectly balanced and more free from vibration than usual is secured.

In lieu of the disks connecting-rods or cranks may be employed, while the steam or other inlet and exhaust parts and pipes for the cylinder may be either located in the trunnions or the connection may be made by flexible pipes or sliding connections.

In order that the invention may be clearly understood, reference is made to the accompanying drawings, which illustrate one form of apparatus made in accordance with this invention, and in which—

Figure 2:
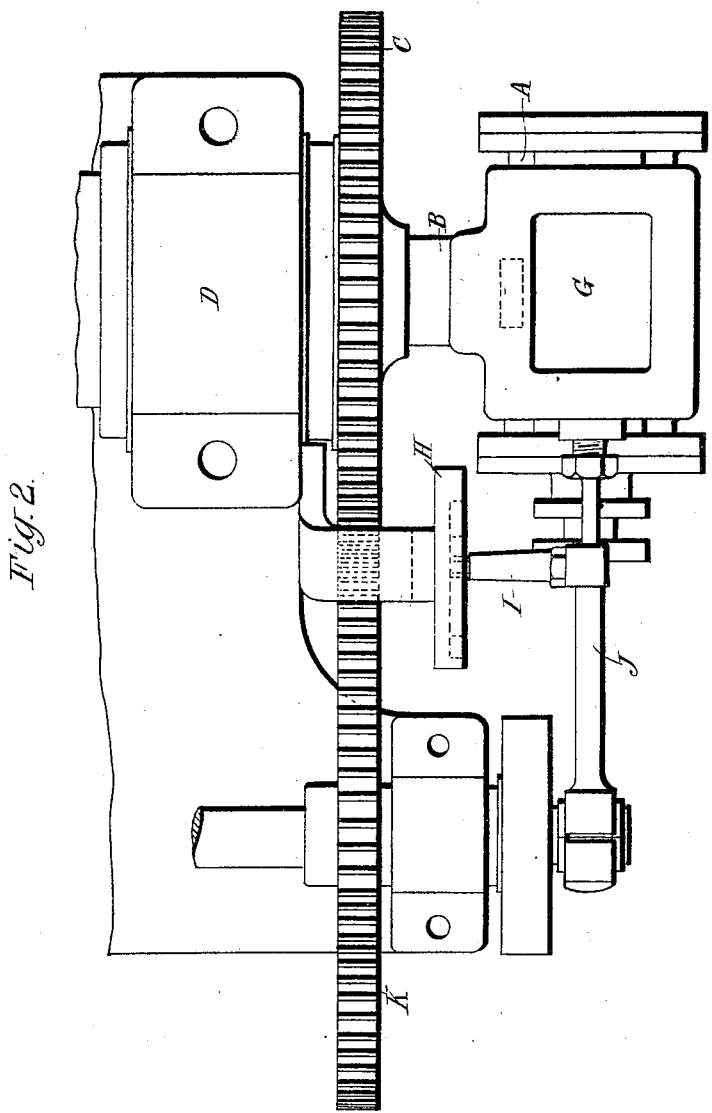
Figure 3:
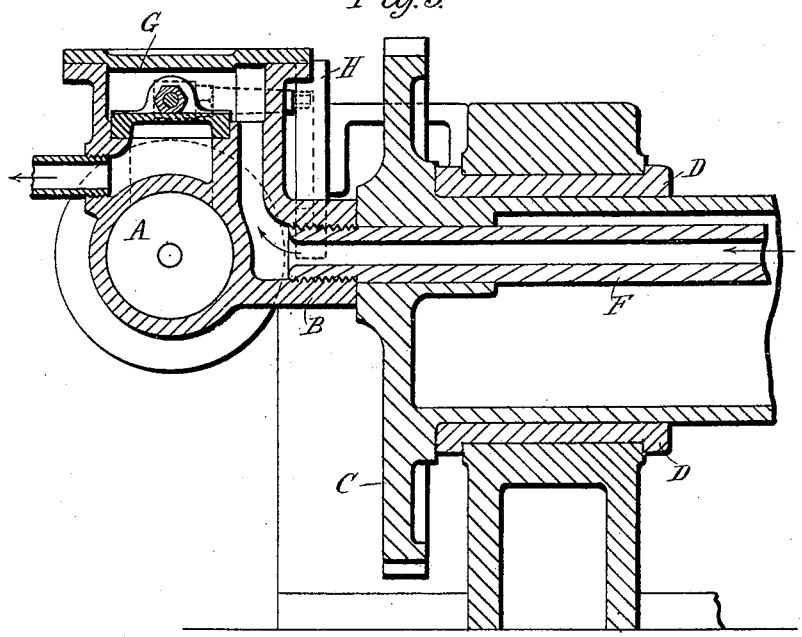

Figure 1 is an elevation, partly in section; Fig. 2, a plan view of same, and Fig. 3 a cross-section on line 1 1 of Fig. 1.

As shown in the drawings, the steam-cylinder A is mounted on a trunnion or bearing B, eccentrically placed with respect to the carrying gear-wheel C, which in turn is carried in suitable bearings D. Steam or other propulsive force passes through pipe F and trunnion B to what is here represented as an ordinary steam-chest G, provided with the usual inlet and exhaust ports and valve, the latter being represented as operated from a fixed heart-shaped cam H, in which travels the roller end of the valve-rod I. The piston-rod J is eccentrically mounted with relation to gear K, which meshes with gear C. With this arrangement of parts it will be evident that the pressure on the piston will not only cause movement of the piston-rod in one direction, but also a corresponding movement of the cylinder in the opposite, and that owing to the movement of these parts being regulated and connected by the gears there will be no loss of power and less vibration will be produced than in ordinary reciprocating engines.

It will be evident that in lieu of steam gas or other fluid pressure may be employed, and also that cranks or other forms of connecting-gear may be substituted for the gear-wheels shown, and that various forms of valves and means for operating same may be devised.

What is claimed is—

1. In steam and other fluid-pressure engines, the combination of a pressure-cylinder, a movable support therefor, and a crank, the parts being so connected that pressure in the cylinder will, at the same time, cause the cylinder to rotate in one direction and the crank to rotate in the opposite direction, substantially as described.

2. In steam and other fluid-pressure engines the combination of a pressure-cylinder mounted eccentrically with reference to the disk or shaft which carries it, a piston or connecting rod similarly mounted on a second disk or shaft, and means for connecting and controlling the motion of the two disks or shafts, substantially as described.

In testimony whereof I have hereunto set my hand in the presence of two subscribing witnesses.

HENRY EMMETT GAMBLE.

Witnesses:
PHILIP M. JUSTICE,
ALLEN PARRY JONES.